(12) United States Patent
Takagi

(10) Patent No.: US 7,142,898 B2
(45) Date of Patent: Nov. 28, 2006

(54) FOLDING ELECTRONIC DEVICE

(75) Inventor: Hisamitsu Takagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 234 days.

(21) Appl. No.: 10/920,167

(22) Filed: Aug. 18, 2004

(65) Prior Publication Data

US 2005/0225952 A1    Oct. 13, 2005

(30) Foreign Application Priority Data

Mar. 30, 2004  (JP)  .............................. 2004-100185

(51) Int. Cl.
*H04M 1/00* (2006.01)

(52) U.S. Cl. ................ 455/575.3; 455/550.1; 455/575.1; 361/683; 439/165

(58) Field of Classification Search ............ 455/575.3, 455/550.1, 90.1, 575.1; 361/683; 439/165
See application file for complete search history.

(56) References Cited

U.S. PATENT DOCUMENTS

| | | | |
|---|---|---|---|
| 6,011,699 A * | 1/2000 | Murray et al. | ............... 361/814 |
| 6,917,824 B1 * | 7/2005 | Kobayashi | ............... 455/575.3 |
| 2002/0005791 A1 | 1/2002 | Ono | |
| 2003/0211873 A1 * | 11/2003 | Komiyama | ............... 455/575.3 |

FOREIGN PATENT DOCUMENTS

| | | |
|---|---|---|
| JP | 10-70375 | 3/1998 |
| JP | 2000-341383 | 12/2000 |
| JP | 2002-32174 | 1/2002 |
| JP | 2002-319771 | 10/2002 |
| JP | 2003-247531 | 9/2003 |

* cited by examiner

*Primary Examiner*—Lester G. Kincaid
*Assistant Examiner*—Nicholas La
(74) *Attorney, Agent, or Firm*—Armstrong, Kratz, Quintos, Hanson & Brooks, LLP

(57) ABSTRACT

A folding electronic device having a first housing and a second housing foldably connected through a hinge mechanism. The folding electronic device includes a first hinge cylinder integrated with the first housing, a second hinge cylinder integrated with the second housing, and a pipe inserted in one end of the first hinge cylinder and in one end of the second hinge cylinder to foldably connect the second housing to the first housing. The folding electronic device further includes a wiring member inserted through the pipe to connect a first electronic component mounted in the first housing and a second electronic component mounted in the second housing, a first gasket provided between the pipe and the first hinge cylinder, a second gasket provided between the pipe and the second hinge cylinder, and a hinge cap for tightly closing the other end of the first hinge cylinder

18 Claims, 19 Drawing Sheets

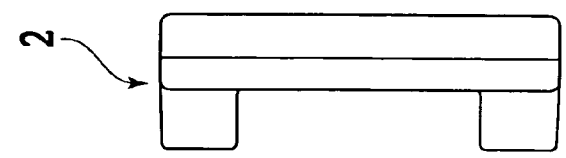
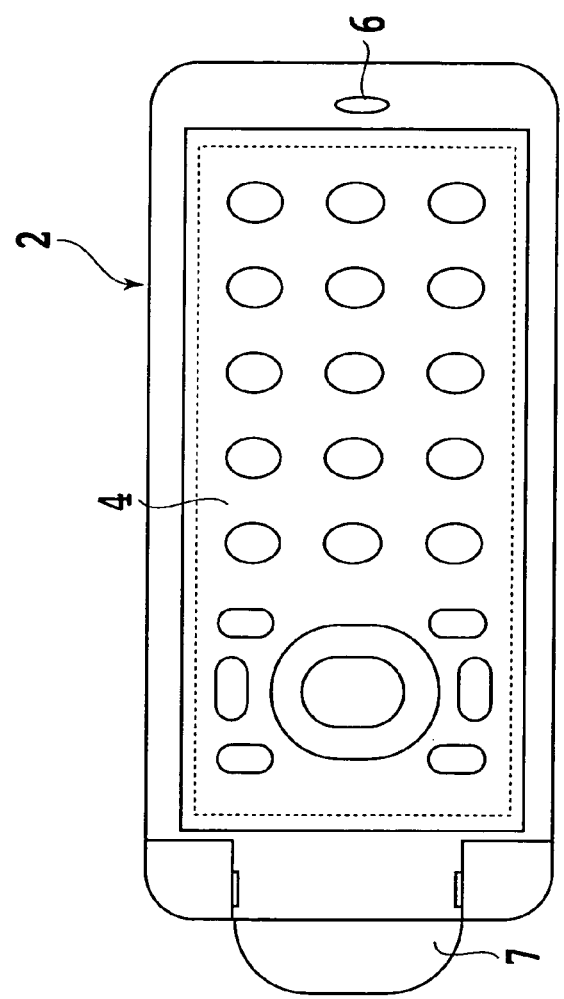
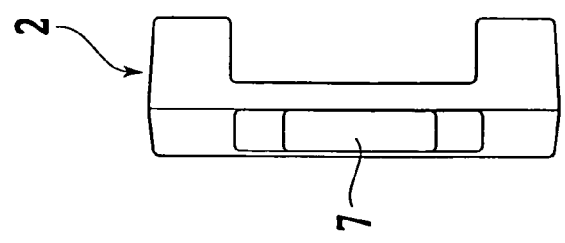

FOLDING ELECTRONIC DEVICE

BACKGROUND OF THE INVENTION

1. Field of the Invention

The present invention relates generally to a folding electronic device such as a folding mobile phone, and more particularly to a waterproof structure for a folding electronic device. It should be noted that the term of "mobile phone" used in this description and claims includes a Personal Handyphone System (PHS) phone.

2. Description of the Related Art

A folding mobile phone has a structure such that a first housing having an input portion and a transmitting portion and a second housing having a display portion and a receiving portion are foldably connected with each other through a hinge mechanism. As to an electrical structure, an electronic component mounted in the first housing and an electronic component mounted in the second housing are connected with each other through a cable or a flexible printed wiring board. The hinge mechanism has not only an original function of foldably connecting the first housing and the second housing, but also a function of maintaining the distance and angle between a receiver and a microphone as required for use as a telephone in consideration of the ergonomically positional relation therebetween.

A mobile phone usable anywhere at any time is essential in the modern society, and it is desired to provide a folding mobile phone having a waterproof structure, which can be used even in the rain, after sea bathing, or in the bathroom of a spa, for example. However, the waterproof structure for the folding mobile phone has not yet been put to practical use because the waterproof structure for the hinge mechanism is difficult to realize. The hinge mechanism is required to have a high degree of waterproofness because of its required opening/closing durability, e.g., a durable lifetime corresponding to at least one hundred thousand of opening/closing operations. Further, it is also necessary to consider deterioration in waterproofness due to the deformation or damage to a case of the mobile phone when a drop impact is applied. Thus, the object can be achieved only for a heavy-duty product such as an outdoor style product.

Japanese Patent Laid-open No. 2002-319771 discloses a folding portable communication terminal capable of effecting a dripproof function for a contact between a flexible printed wiring board and a connector. This folding portable communication terminal has a structure such that an input portion and a display portion are foldably connected with each other through a hinge and that an electronic component mounted in the input portion and an electronic component mounted in the display portion are connected with each other through a flexible printed wiring board. The input portion and the display portion are respectively provided with insertion portions for allowing the insertion of the flexible printed wiring board in the vicinity of the hinge. At least one of these insertion portions is provided with a pair of packings abutting against the front and rear surfaces of the flexible printed wiring board.

In the folding portable communication terminal as described in the above-cited publication, a simple dripproof structure is provided by making the pair of packings abut against the front and rear surfaces of the flexible printed wiring board. However, any completely waterproof structure is not given for the hinge portion for pivotably connecting the input portion and the display portion. For example, in the case that the portable communication terminal is immersed in the water, the entry of water into the device cannot be completely prevented.

SUMMARY OF THE INVENTION

It is therefore an object of the present invention to provide a folding electronic device having a completely waterproof structure.

In accordance with an aspect of the present invention, there is provided a folding electronic device including a first housing having an integrally formed, first hinge cylinder having a first end and a second end; a second housing having an integrally formed, second hinge cylinder having a first end and a second end; a pipe inserted in the first end of the first hinge cylinder and the first end of the second hinge cylinder to connect the first housing and the second housing so that the second housing is foldable with respect to the first housing; a wiring member inserted through the pipe to connect a first electronic component mounted in the first housing and a second electronic component mounted in the second housing; a first gasket provided between the pipe and the first hinge cylinder; a second gasket provided between the pipe and the second hinge cylinder; and a first hinge cap for tightly closing the second end of the first hinge cylinder.

Preferably, the folding electronic device further includes a tube having a third gasket at one end and a fourth gasket at the other end. The tube accommodates the wiring member and is inserted through the pipe. The third gasket tightly seals a wiring leading portion of the first housing, and the fourth gasket tightly seals a wiring leading portion of the second housing. The wiring member includes a cable or a flexible printed wiring board. Preferably, the folding electronic device further includes a first metal pipe inserted in the first end of the first hinge cylinder, the first metal pipe having an inner circumferential surface coming into pressure contact with the first gasket, and a second metal pipe inserted in the first end of the second hinge cylinder, the second metal pipe having an inner circumferential surface coming into pressure contact with the second gasket.

Preferably, the folding electronic device further includes a third hinge cylinder integrated with the first housing, the third hinge cylinder having a first end and a second end; a hinge module having one end inserted in the second end of the second hinge cylinder and another end inserted in the first end of the third hinge cylinder; a third gasket provided between the hinge module and the second hinge cylinder; and a second hinge cap for tightly closing the second end of the third hinge cylinder. The hinge module includes a case inserted and fixed in the third hinge cylinder; a fixed cam plate accommodated in the case; a movable cam plate inserted in the second end of the second hinge cylinder so as to be nonrotatable relative to the second hinge cylinder; a plurality of balls held between the fixed cam plate and the movable cam plate; a connecting shaft for connecting the case and the movable cam plate; and a coil spring accommodated in the case for biasing the fixed cam plate toward the movable cam plate.

In accordance with another aspect of the present invention, there is provided a folding electronic device including a first housing having an integrally formed, first hinge cylinder having a first end and a second end; a second hinge cylinder having a wiring leading hollow shaft, a first end, and a second end; a second housing engaged with the wiring leading hollow shaft of the second hinge cylinder so as to be rotatable about the wiring leading hollow shaft; a pipe inserted in the first end of the first hinge cylinder and the first end of the second hinge cylinder to connect the first housing and the second housing so that the second housing is foldable with respect to the first housing; a wiring member inserted through the pipe to connect a first electronic component mounted in the first housing and a second electronic component mounted in the second housing; a first gasket provided between the pipe and the first hinge cylinder; a second gasket provided between the pipe and the second hinge cylinder; a first hinge cap for tightly closing the second end of the first hinge cylinder; and a third gasket provided between the wiring leading hollow shaft of the second hinge cylinder and the second housing.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 2A is a plan view of a fixed input unit (first housing);

FIG. 2B is a left side view of FIG. 2A;

FIG. 2C is a right side view of FIG. 2A;

DETAILED DESCRIPTION OF THE PREFERRED EMBODIMENTS

Figure 1A:
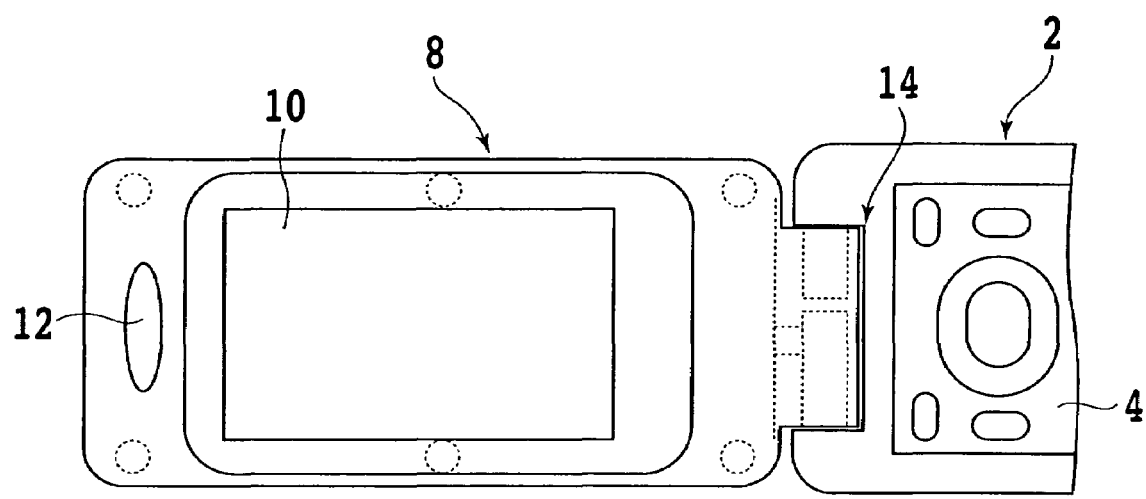
FIG. 1A is a partially cutaway, plan view of a folding mobile phone having a uniaxial hinge structure.
Figure 1B:
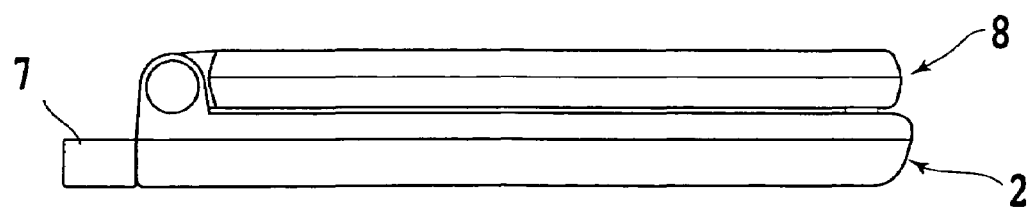
FIG. 1B is a side view of the mobile phone shown in FIG. 1A in its folded condition.

Referring to FIG. 1A, a partially cutaway, plan view of a folding mobile phone having a uniaxial hinge structure is shown. FIG. 1B is a side view of the mobile phone shown in FIG. 1A in its folded condition. FIG. 2A is a plan view of a fixed input unit (first housing) of the mobile phone. FIG. 2B is a left side view of FIG. 2A, and FIG. 2C is a right side view of FIG. 2A. As shown in FIG. 1A, a first housing (fixed housing) 2 having an input portion 4 and a second housing (movable housing) 8 having a display portion 10 such as an LCD are foldably connected with each other through a hinge mechanism 14.

Figure 3A:
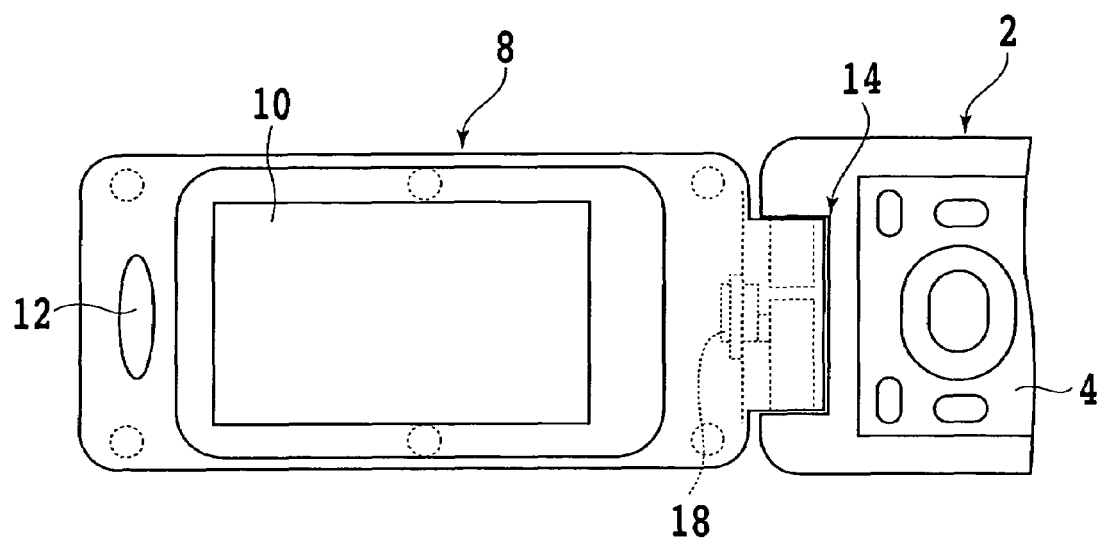
FIG. 3A is a partially cutaway, plan view of a folding mobile phone having a biaxial hinge structure.
Figure 3B:
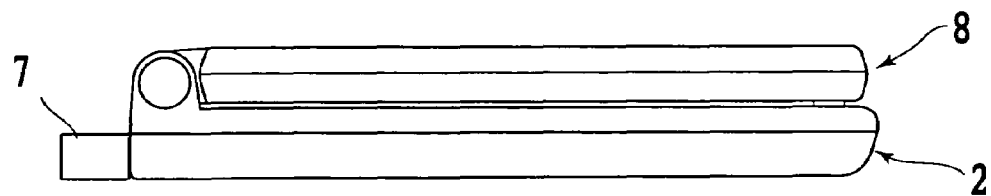
FIG. 3B is a side view of the mobile phone shown in FIG. 3A in its folded condition.

As shown in FIG. 2A, the first housing 2 further has a transmitting portion 6 accommodating a microphone and an antenna accommodating portion 7 accommodating an antenna. As shown in FIG. 1A, the second housing 8 further has a receiving portion 12 accommodating an earphone. Referring to FIG. 3A, a partially cutaway, plan view of a folding mobile phone having a biaxial hinge structure is shown. FIG. 3B is a side view of the mobile phone shown in FIG. 3A in its folded condition. As shown in FIG. 3A, a second housing 8 is foldably connected through a hinge mechanism 14 to a first housing 2 and mounted thereto so as to be rotatable about a wiring leading hollow shaft 18.

Figure 4:
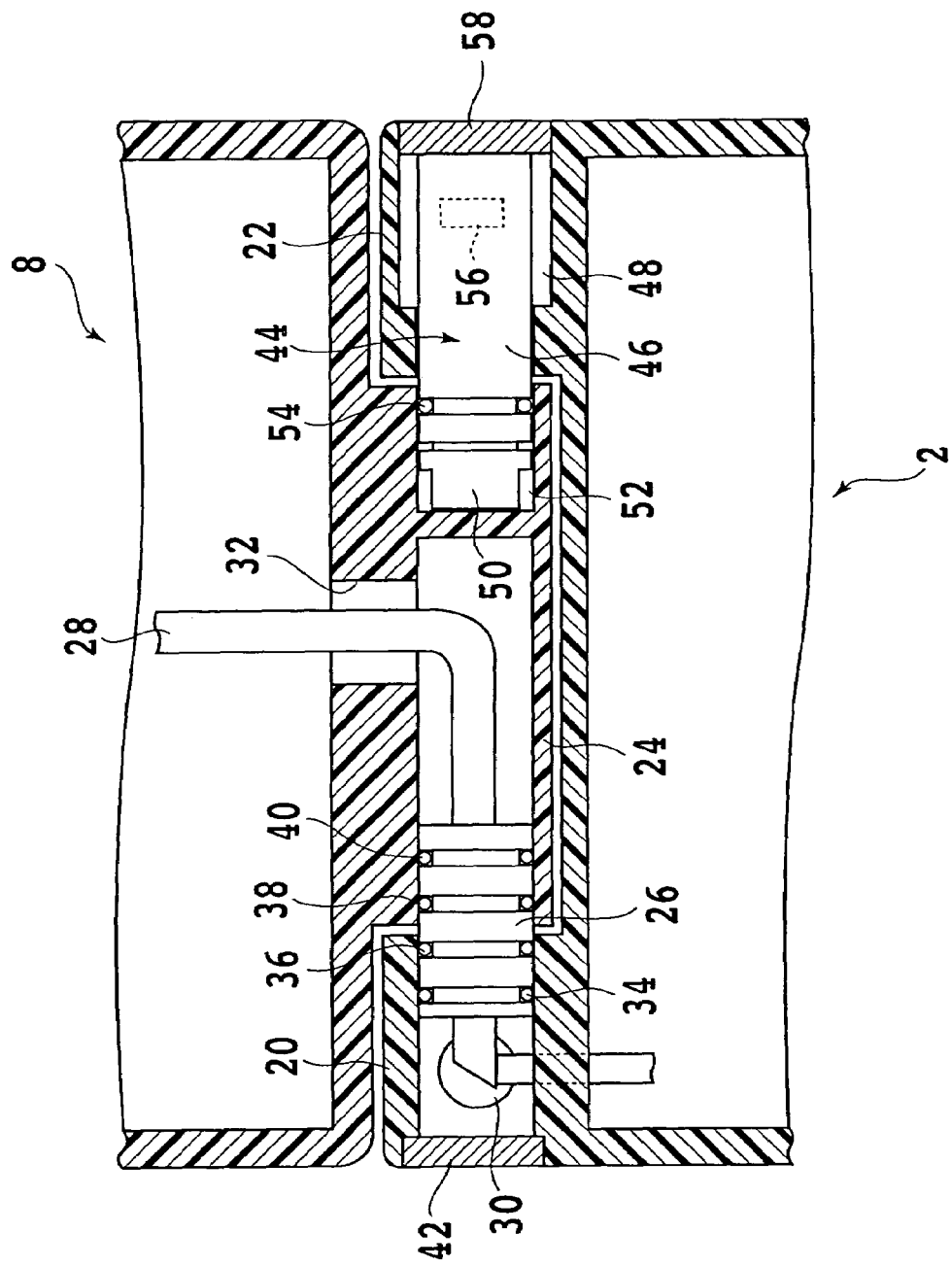
FIG. 4 is a sectional view of a folding mobile phone according to a first preferred embodiment of the present invention.
Figure 5:
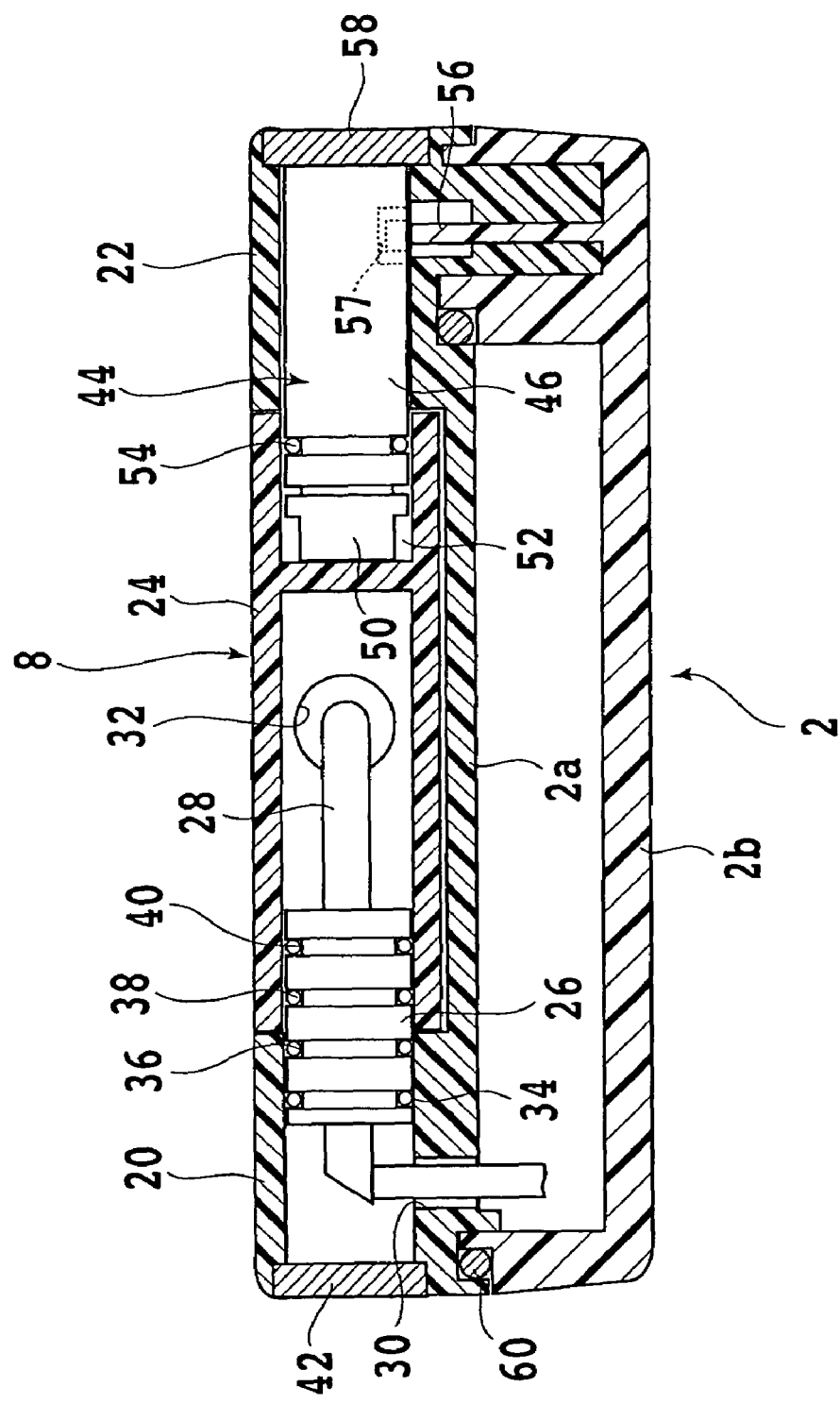
FIG. 5 is a sectional view of the mobile phone shown in FIG. 4 in its folded condition.

Referring to FIG. 4, a sectional view of a folding mobile phone according to a first preferred embodiment of the present invention is shown. FIG. 5 is a sectional view of the mobile phone shown in FIG. 4 in its folded condition. The first housing 2 is integrally formed with a pair of hinge cylinders 20 and 22. The second housing 8 is integrally formed with a hinge cylinder 24 fitted between the hinge cylinders 20 and 22 of the first housing 2. These hinge cylinders 20, 22, and 24 have substantially the same inner diameter. The first and second housings 2 and 8 are formed of resin, for example. A pipe 26 is inserted in one end portion of the hinge cylinder 20 and in one end portion of the hinge cylinder 24. A hinge module 44 is inserted in the other end portion of the hinge cylinder 24 and in the hinge cylinder 22. Thus, the second housing 8 is foldably connected to the first housing 2.

A wiring member 28 such as a cable or a flexible printed wiring board is inserted through the pipe 26 to connect an electronic component mounted in the first housing 2 and an electronic component mounted in the second housing 8. Reference numeral 30 denotes a wiring leading opening of the first housing 2, and reference numeral 32 denotes a wiring leading opening of the second housing 8. The pipe 26 is preferably formed of metal such as stainless steel. Alternatively, the pipe 26 may be formed of resin.

Two gaskets 34 and 36 are provided between the outer circumferential surface of the pipe 26 and the inner circumferential surface of the hinge cylinder 20. Two gaskets 38 and 40 are also provided between the outer circumferential surface of the pipe 26 and the inner circumferential surface of the hinge cylinder 24. Further, a hinge cap 42 is bonded to the other end of the hinge cylinder 20, thereby tightly closing the other end of the hinge cylinder 20. In this manner, the four gaskets 34 to 40 are provided between the outer circumferential surface of the pipe 26 and the inner circumferential surfaces of the hinge cylinders 20 and 24, so that this hinge portion can provide a rotatable waterproof structure.

Thus, the right end of the hinge cylinder 20 is tightly sealed by the two gaskets 34 and 36, and the left end of the hinge cylinder 20 is tightly closed by the hinge cap 42, so that the entry of water into the first housing 2 can be prevented. Further, the left end of the hinge cylinder 24 is tightly sealed by the two gaskets 38 and 40, so that the entry of water into the second housing 8 can be prevented.

The hinge module 44 has a case 46 inserted and fixed in the hinge cylinder 22. The case 46 is integrally formed with a rotation prevention key 48, and the hinge cylinder 22 is formed with a keyway. The rotation prevention key 48 of the case 46 is inserted into the keyway of the hinge cylinder 22, thereby nonrotatably mounting the case 46 to the hinge cylinder 22. The hinge module 44 has a rotating member 50 rotatable relative to the case 46. The rotating member 50 is nonrotatably mounted to the hinge cylinder 24. More specifically, the rotating member 50 is made nonrotatable relative to the hinge cylinder 24 by a key structure 52 composed of a key and a keyway.

As shown in FIG. 5, the first housing 2 is integrally formed with a removal prevention rib 56, and the case 46 is formed with a recess 57 for engaging the upper end of the rib 56, thereby preventing rightward removal of the hinge module 44 from the hinge cylinder 22. A gasket 54 is provided between the outer circumferential surface of the case 46 of the hinge module 44 and the inner circumferential surface of the hinge cylinder 24, thereby providing a waterproof structure on the movable side of the hinge module 44.

The right end of the hinge cylinder 22 in which the hinge module 44 is inserted is tightly closed by a hinge cap 58, thereby making waterproof the inside of the fixed case 46 of the hinge module 44. As shown in FIG. 5, the first housing 2 is composed of a front case 2a and a rear case 2b joined to the front case 2a. A gasket 60 is mounted between the joined surfaces of the front case 2a and the rear case 2b, thereby tightly sealing the inside of the first housing 2. Such a tight sealing structure will be hereinafter described in detail.

Figure 6:
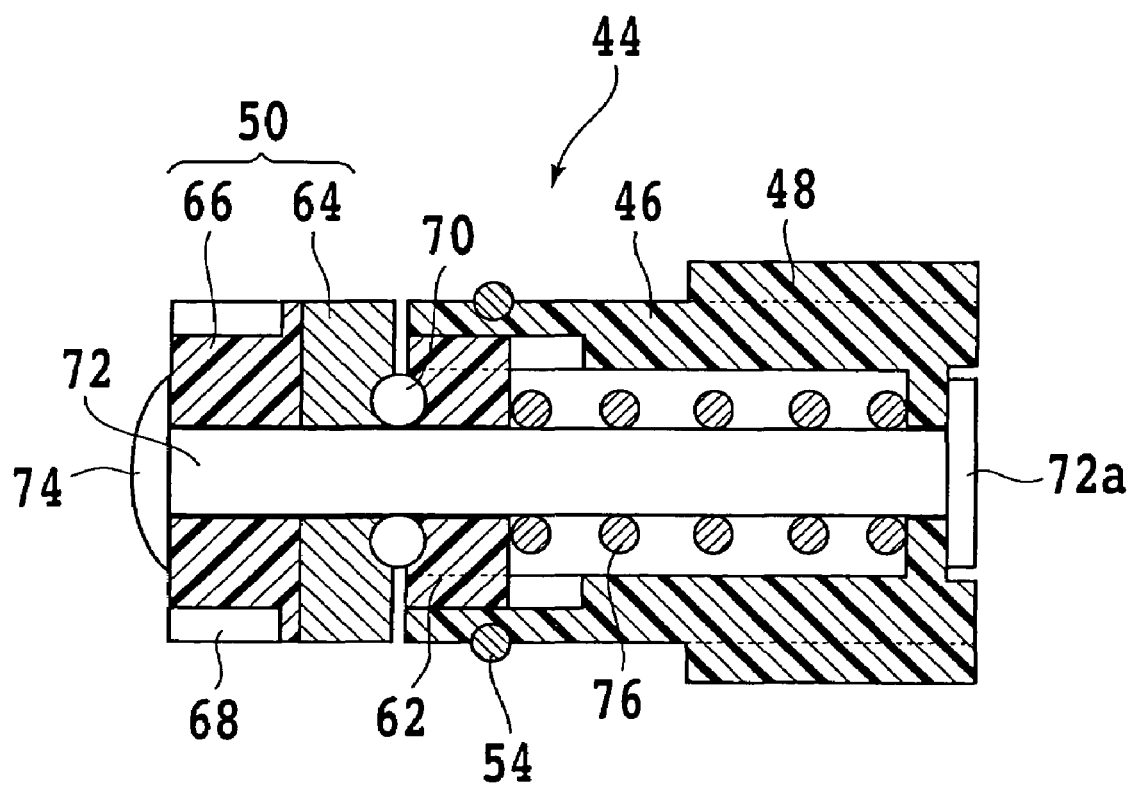
FIG. 6 is a sectional view of a hinge module.

FIG. 6 shows a sectional view of the hinge module 44. The hinge module 44 has the case 36 integrally formed with the rotation prevention key 48, and also has a fixed cam plate 62 accommodated in the case 46. The case 46 and the fixed cam plate 62 are formed of resin. As mentioned above, the case 46 is inserted and fixed in the hinge cylinder 22. The hinge module 44 further includes a movable cam plate 64 formed of metal and a mounting member 66 formed of resin. The mounting member 66 is bonded to the movable cam plate 64. The mounting member 66 has a keyway 68. The movable cam plate 64 and the mounting member 66 constitute the rotating member 50.

A pair of balls 70 are held between the fixed cam plate 62 and the movable cam plate 64 so as to be spaced circumferentially 180° apart from each other. Recesses for accommodating the balls 70 are formed on the opposed surfaces of the fixed cam plate 62 and the movable cam plate 64. The case 46 and the rotating member 50 are connected together by a connecting shaft 72 having a head 72a. The connecting shaft 72 is riveted at its left end 74 as viewed in FIG. 6. A coil spring 76 is accommodated in the case 46 to bias the fixed cam plate 62 toward the movable cam plate 64. The gasket 54 is mounted on the case 46 to thereby prevent the entry of water into the movable side of the hinge module 44 as shown in FIG. 4.

The operation of the hinge module 44 will now be described. When the second housing 8 is rotated from a talking position toward a folded position to reach a first given position just before the folded position by a given angle, e.g., 20°, the pair of balls 70 come into circumferentially one end portions of the recesses of the movable cam plate 64 and abut against inclined surfaces of the recesses. Accordingly, the biasing force of the coil spring 76 is converted into a rotational force for rotating the movable cam plate 64 from the above first given position to the folded position. As a result, the second housing 8 is rotated to the folded position and maintained at this position.

Conversely, when the second housing 8 is rotated from the folded position toward the talking position to reach a second given position just before the talking position by a given angle, e.g., 20°, the pair of balls 70 come into circumferentially other end portions of the recesses of the movable cam plate 64 and abut against inclined surfaces of the recesses. Accordingly, the biasing force of the coil spring 76 is converted into a rotational force for rotating the rotating member 50 from the above second given position to the talking position. As a result, the second housing 8 is rotated to the talking position and maintained at this position.

Figure 7A:
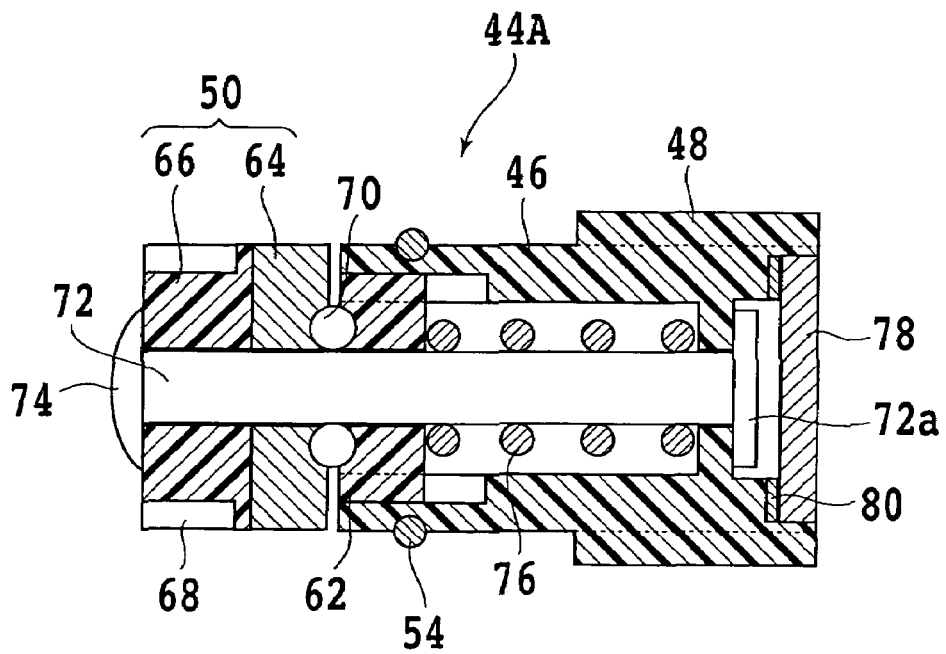
FIG. 7A is a sectional view of a hinge module having a waterproof structure for a fixed case.
Figure 7B:
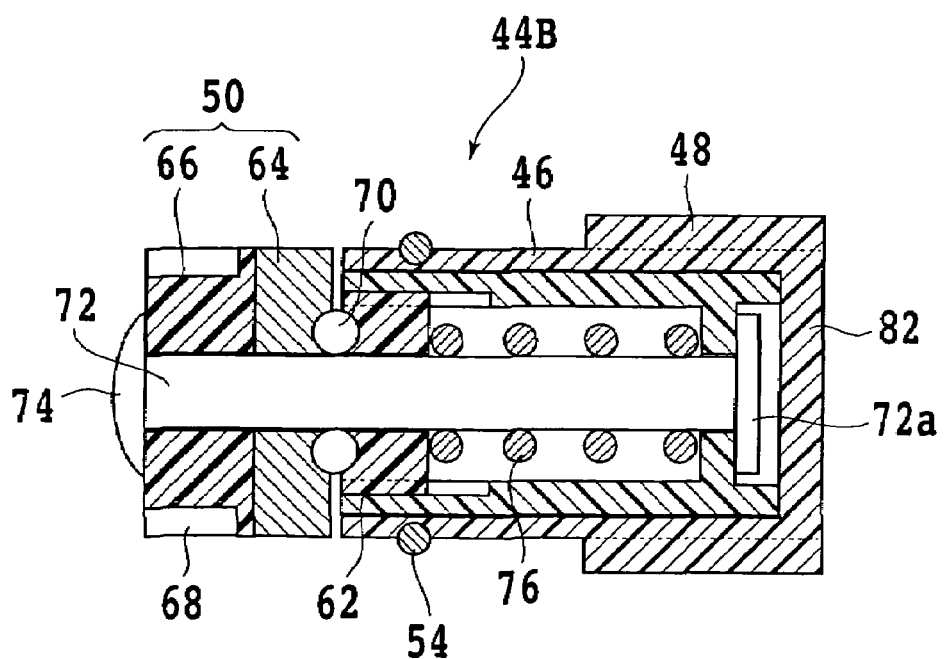
FIG. 7B is a sectional view of a hinge module having another waterproof structure for a fixed case.

FIGS. 7A and 7B are sectional views of hinge modules 44A and 44B each having a waterproof structure for a fixed case. As shown in FIG. 7A, the hinge module 44A has a case 46, and the right end of the case 46 is tightly closed by an end cap 78. The end cap 78 is fixed to the case 46 by adhesion or ultrasonic welding, for example. The other structures of this preferred embodiment are similar to those of the hinge module 44 shown in FIG. 6.

As shown in FIG. 7B, a waterproof hinge case 82 is bonded to a case 46 of the hinge module 44B. The right end of the case 46 is tightly closed by the waterproof hinge case 82. The other structures of this preferred embodiment are similar to those of the hinge module 44 shown in FIG. 6. In the hinge module 44A or 44B, the case 46 is tightly closed by the end cap 78 or the waterproof hinge case 82, thereby preventing the entry of water into the fixed case 46.

Figure 8:
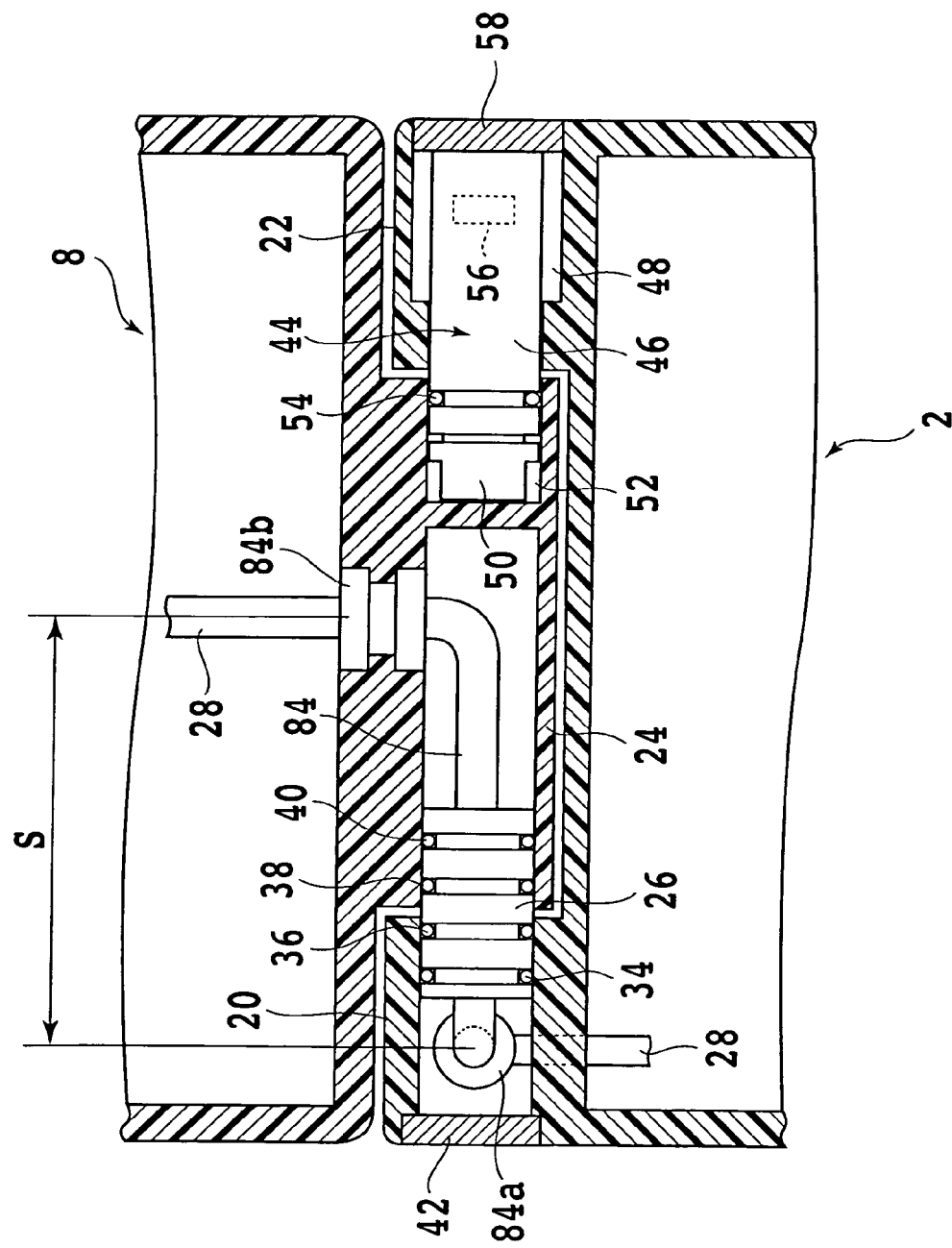
FIG. 8 is a sectional view of a folding mobile phone according to a second preferred embodiment of the present invention.

Referring next to FIG. 8, a sectional view of a folding mobile phone according to a second preferred embodiment of the present invention is shown. In this preferred embodiment, the hinge portion including a wiring member has a double-waterproof structure to improve the waterproof reliability. More specifically, a wiring member 28 is accommodated in a tube 84 integrally formed with gaskets 84a and 84b. The wiring leading opening 30 of the first housing 2 is tightly sealed by the gasket 84a, and the wiring leading opening 32 of the second housing 8 is tightly sealed by the gasket 84b. The tube 84 is formed of a soft material such as silicone rubber.

Figure 9A:
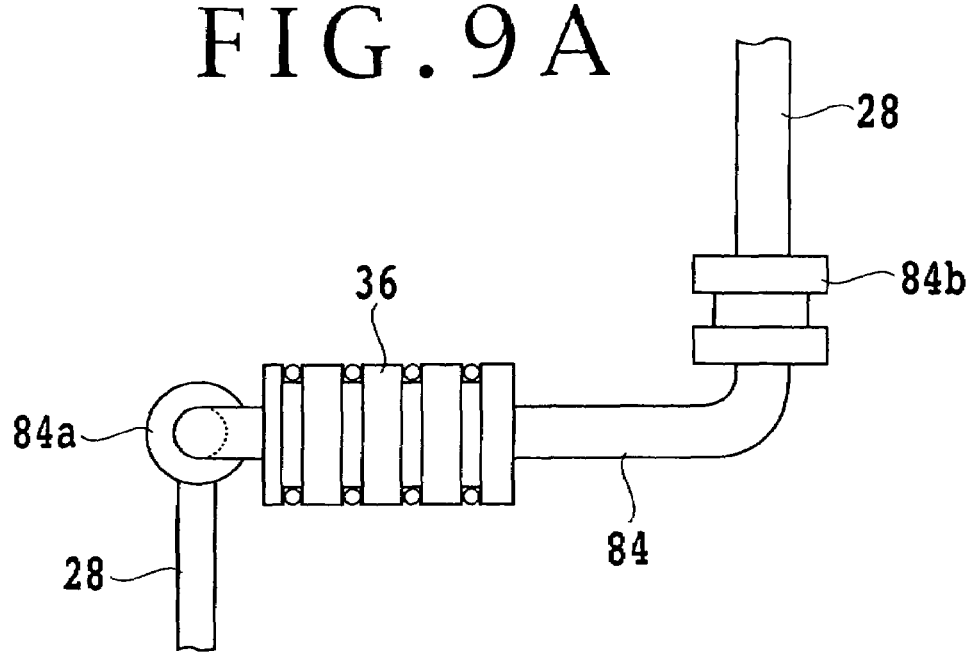
FIG. 9A is a side view of a tube having bent portions.
Figure 9B:
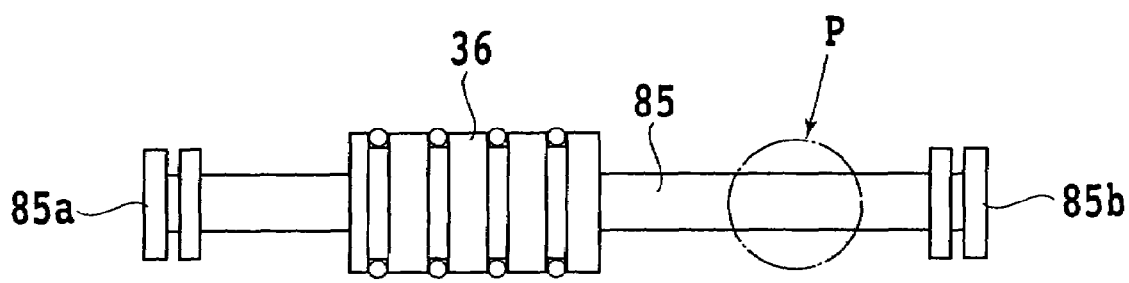
FIG. 9B is a side view of a straight tube.
Figure 9C:
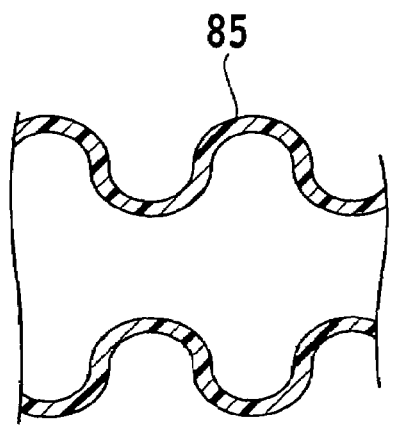
FIG. 9C is an enlarged sectional view of an encircled portion P shown in FIG. 9B.

The other structures of this preferred embodiment are similar to those of the first preferred embodiment. In this preferred embodiment, the span S is set large, so as to reduce a torsional stress of the wiring member 28 and thereby improve the durability. As the tube 84, a preliminarily bent tube as shown in FIG. 9A is used. Alternatively, a bellows straight tube 85 as shown in FIG. 9B may be prepared and bent in mounting. The tube 85 is integrally formed at its opposite ends with gaskets 85*a* and 85*b*. FIG. 9C is an enlarged sectional view of an encircled portion P shown in FIG. 9B.

Figure 10:
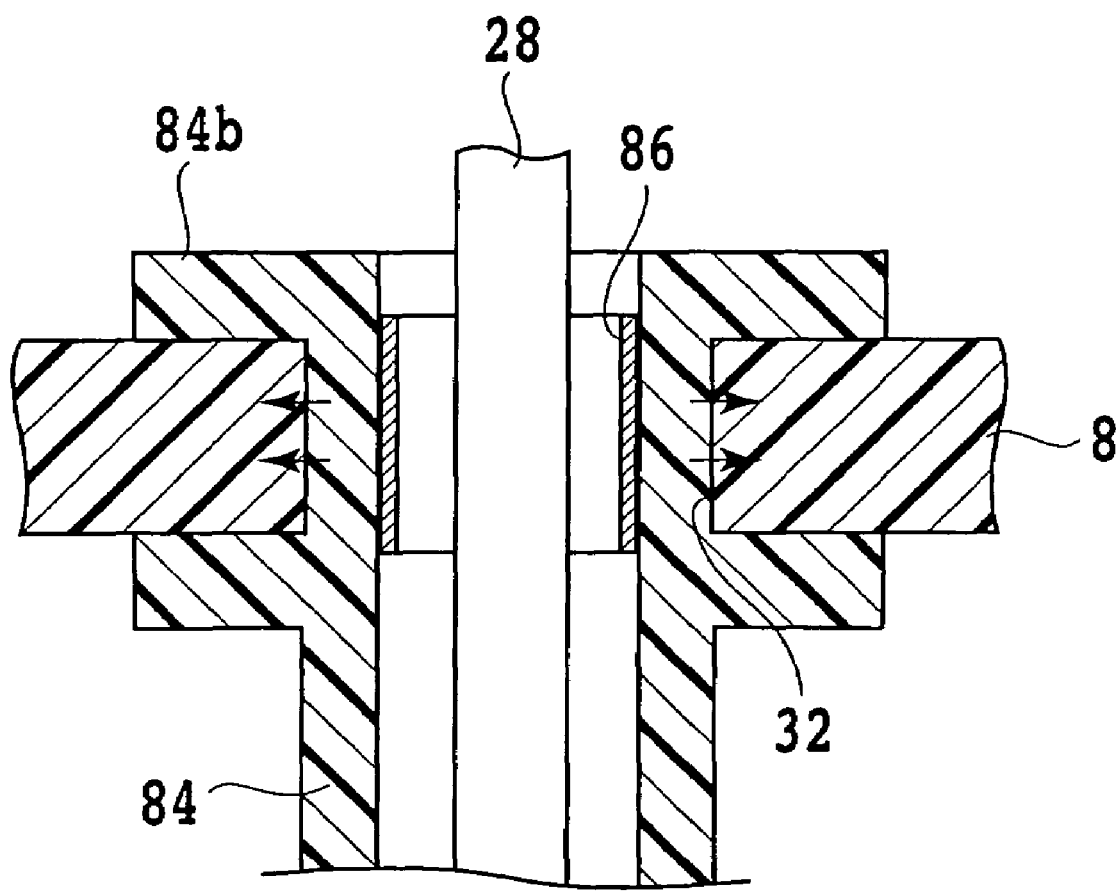
FIG. 10 is a sectional view showing a waterproof structure of a gasket applied to the wiring leading portion of the second housing shown in FIG. 8.

FIG. 10 is a sectional view showing a waterproof structure of the gasket 84*b* applied to the wiring leading opening 32 of the second housing 8. A C-shaped leaf spring 86 is provided in the tube 84 so as to apply a pressure to the gasket 84*b* in its normal direction, thereby making a pressure contact of the gasket 84*b* with the second housing 8 defining the wiring leading opening 32. A similar waterproof structure is applicable also to the wiring leading opening 30 of the first housing 2.

Figure 11:
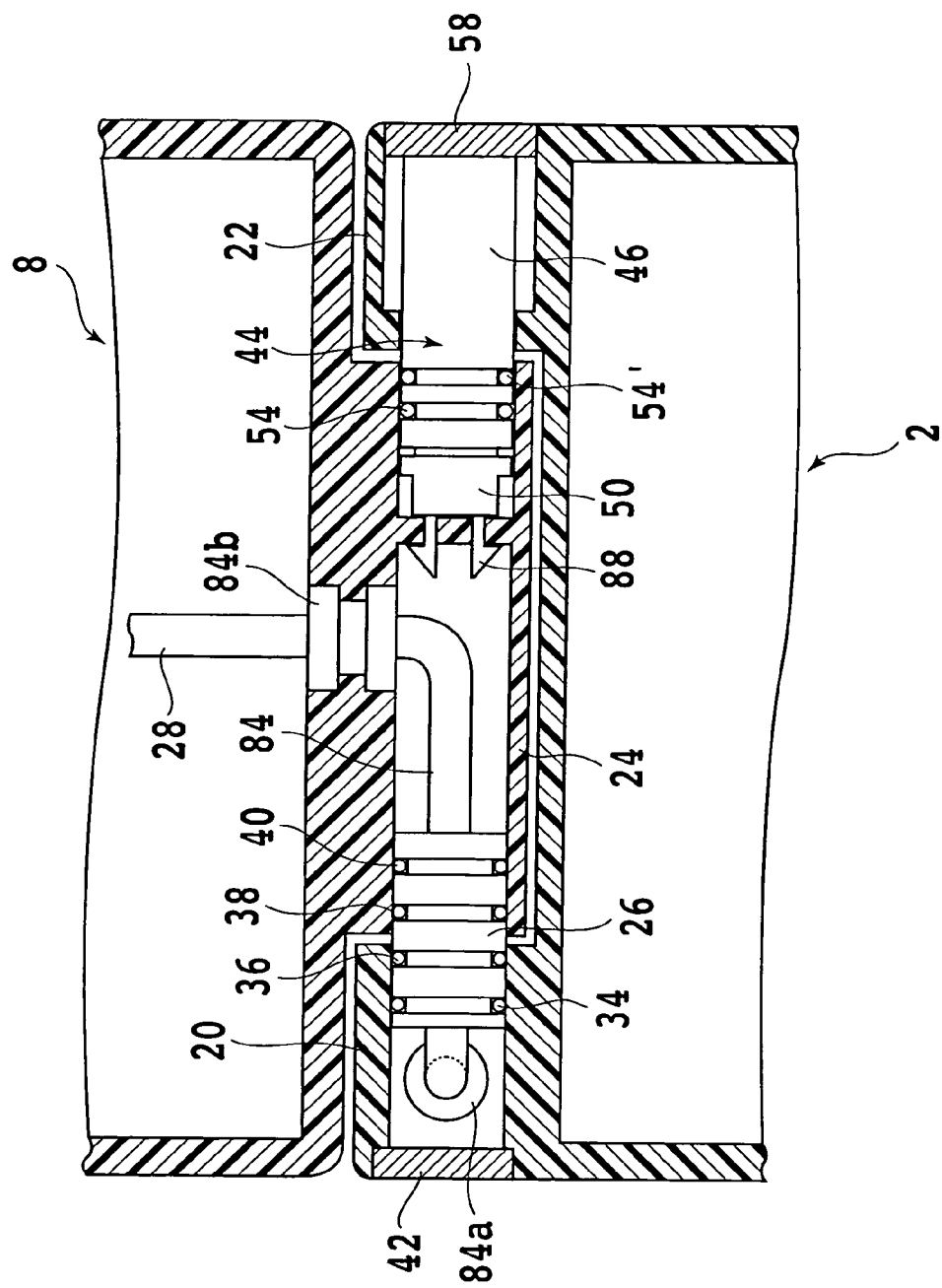
FIG. 11 is a sectional view of a folding mobile phone according to a third preferred embodiment of the present invention.

Referring next to FIG. 11, a sectional view of a folding mobile phone according to a third preferred embodiment of the present invention is shown. In this preferred embodiment, the rotating member 50 of the hinge module 44 is integrally formed with a hinge fixing hook 88. The hinge fixing hook 88 is engaged with the hinge cylinder 24 to thereby prevent axial removal of the hinge module 44. Accordingly, this preferred embodiment does not include the removal prevention rib 56 employed in the first and second preferred embodiments. Further, the third preferred embodiment includes two gaskets 54 and 54' to improve the waterproofness for the hinge module 44.

Figure 12:
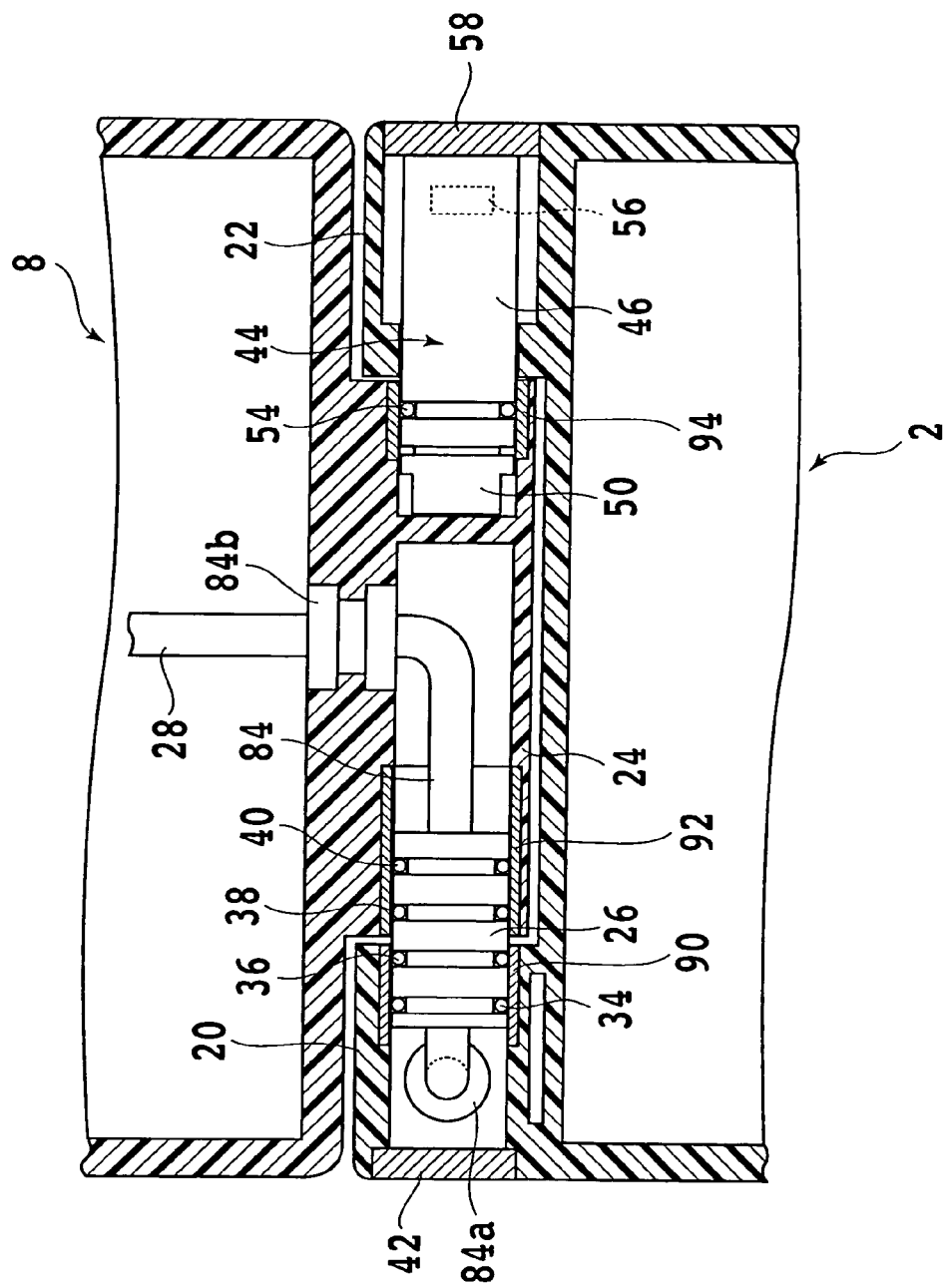
FIG. 12 is a sectional view of a folding mobile phone according to a fourth preferred embodiment of the present invention.

Referring next to FIG. 12, a sectional view of a folding mobile phone according to a fourth preferred embodiment of the present invention is shown. In this preferred embodiment, metal pipes 90, 92, and 94 formed of stainless steel or the like are inserted in the hinge cylinders 20 and 24 to improve the waterproof accuracy. In the case that the housings 2 and 8 are formed of resin, torsion or the like is prone to occur, possibly causing a reduction in waterproofness of the hinge portion. To cope with this possibility, the metal pipes 90, 92, and 94 are inserted in the hinge cylinders 20 and 24 at positions where the gaskets 34 to 40 and 54 are located according to this preferred embodiment. The gaskets 34 to 40 and 54 are made to come into pressure contact with the metal pipes 90, 92, and 94, thereby providing an improved waterproof structure. Thus, the object with which each gasket comes into pressure contact is formed of metal, so that a dimensional change can be reduced to thereby improve the waterproof performance.

Figure 13:
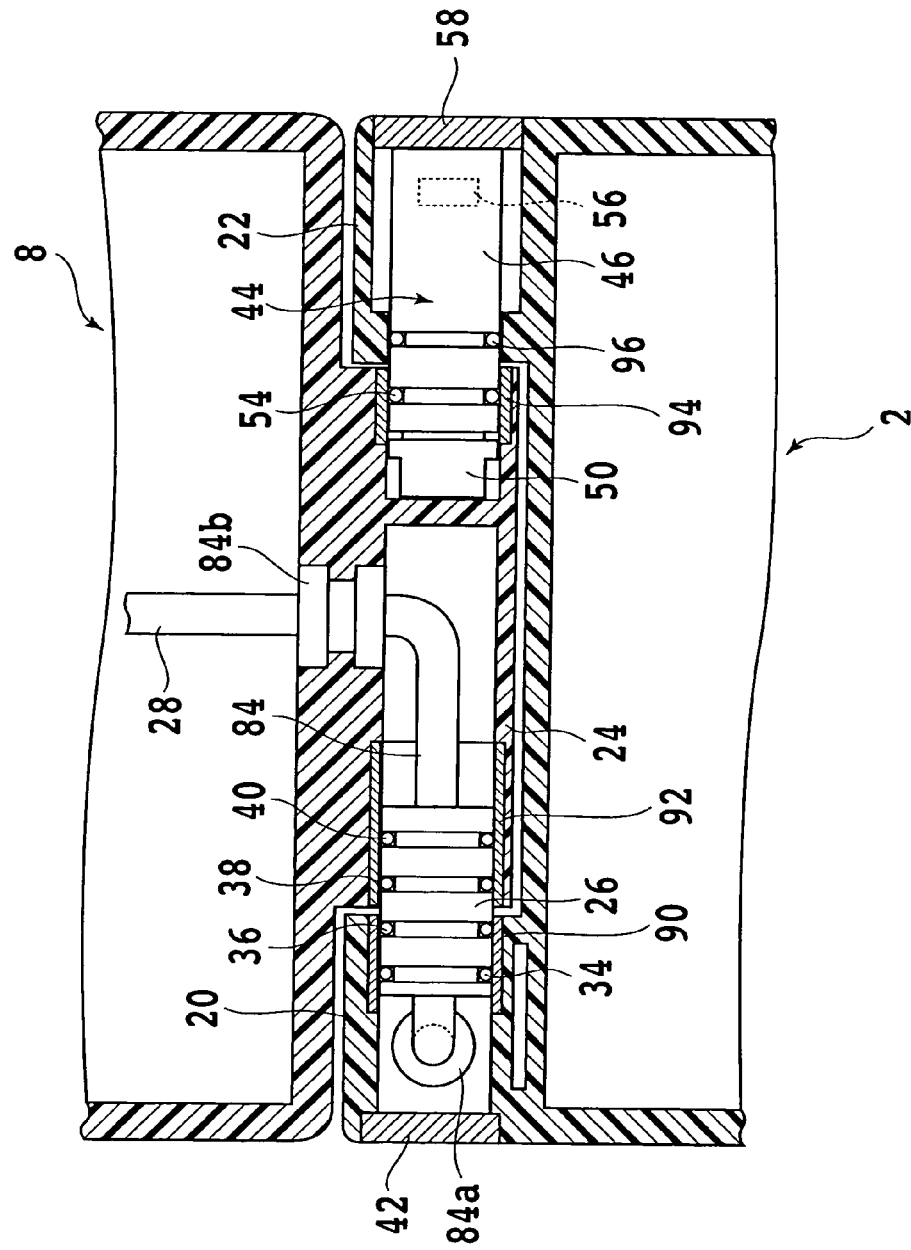
FIG. 13 is a sectional view of a folding mobile phone according to a fifth preferred embodiment of the present invention.

Referring next to FIG. 13, a sectional view of a folding mobile phone according to a fifth preferred embodiment of the present invention is shown. This preferred embodiment is similar to the fourth preferred embodiment shown in FIG. 12 except the point that a gasket 96 is added to the hinge module 44. Since the gasket 96 is added to the hinge module 44, the entry of water into the fixed case 46 of the hinge module 44 can be prevented. Accordingly, this configuration is effective in the case that it is applied to the hinge module 44 whose case 46 has no waterproof structure as shown in FIG. 6.

Figure 14:
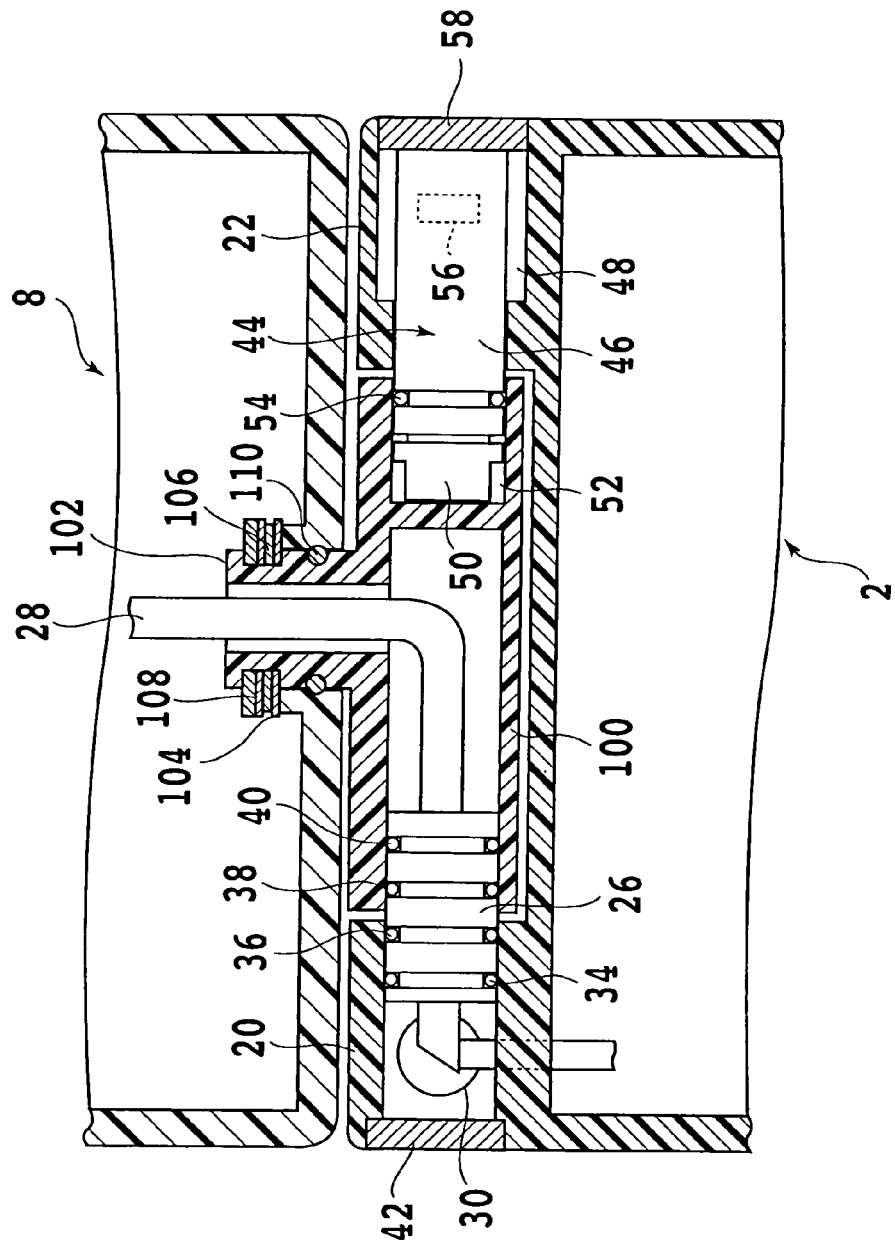
FIG. 14 is a sectional view of a folding mobile phone according to a sixth preferred embodiment of the present invention.
Figure 15:
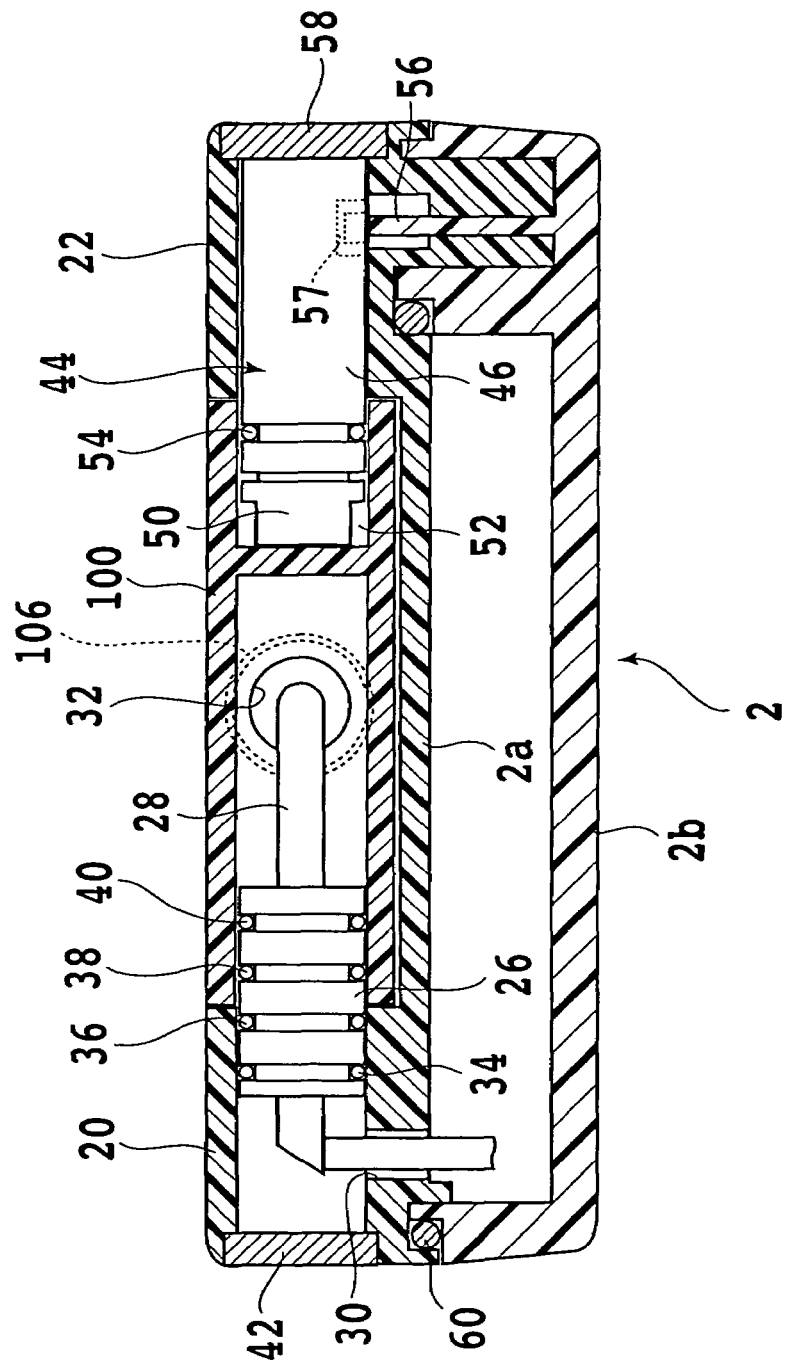
FIG. 15 is a sectional view of the mobile phone shown in FIG. 14 in its folded condition.

Referring next to FIG. 14, a sectional view of a folding mobile phone according to a sixth preferred embodiment of the present invention is shown. FIG. 15 is a sectional view of the mobile phone shown in FIG. 14 in its folded condition. The mobile phone according to this preferred embodiment has a biaxial hinge structure. That is, the biaxial hinge structure includes a substantially T-shaped hinge cylinder 100 integrally formed with a hollow shaft 102 for leading a wiring member 28. The second housing 8 is mounted to the first housing 2 so as to be rotatable about the hollow shaft 102 of the hinge cylinder 100.

The hollow shaft 102 is engaged with the second housing 8, and an engaging portion therebetween is provided with a rugged cam 104, a snap ring or nut 106, and a coned disc spring 108. Further, the engaging portion between the hollow shaft 102 and the second housing 8 is provided with a gasket 110 for preventing the entry of water into the second housing 8. The other configurations of this preferred embodiment are similar to those of the first preferred embodiment shown in FIG. 4.

Figure 16A:
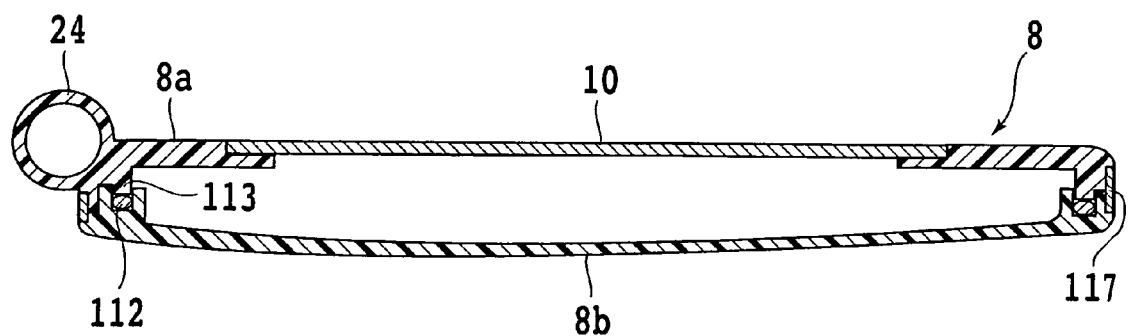
FIG. 16A is a sectional view of a movable housing (second housing) having a vertically compressed gasket.

FIG. 16A is a sectional view of a second housing (movable housing) 8 composed of a front case 8*a* and a rear case 8*b* joined to the front case 8*a*, wherein the front case 8*a* is formed of Mg alloy. In general, a resin case is low in strength. To increase the strength of the front case 8*a*, the front case 8*a* is formed of Mg alloy in this preferred embodiment. Further, the front case 8*a* is integrally formed with a rib 113, and the rib 113 vertically abuts against a gasket 112 provided between the joined surfaces of the front case 8*a* and the rear case 8*b*. Thus, the gasket 112 is retained in a vertically compressed condition. Alternatively, the front case 8*a* may be formed of Al alloy or Zn alloy.

Figure 16B:
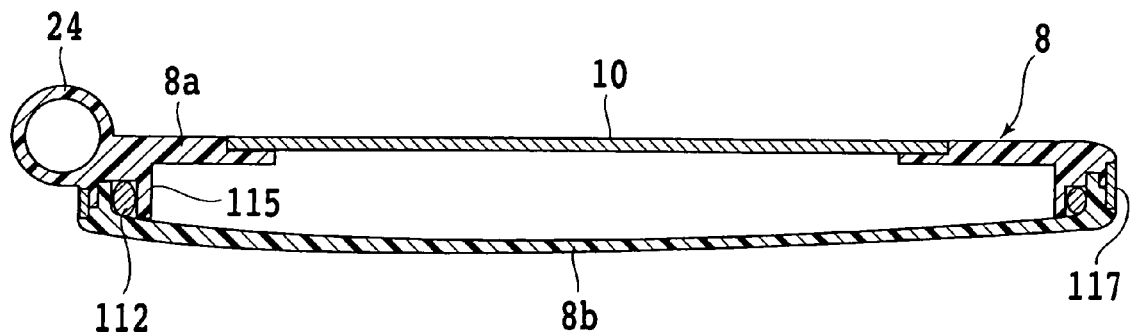
FIG. 16B is a sectional view of a movable housing having a horizontally compressed gasket.

FIG. 16B is a sectional view of a second housing 8 according to another preferred embodiment of the present invention, wherein the gasket 112 is horizontally compressed. Also in this preferred embodiment, the front case 8*a* is formed of metal such as Mg alloy. Further, the front case 8*a* is integrally formed with a rib 115, and the rib 115 horizontally abuts against the gasket 112. Thus, the gasket 112 is retained in a horizontally compressed condition. In each of the above preferred embodiments shown in FIGS. 16A and 16B, an elastic band 117 is bonded to the outer peripheral surfaces of the front case 8*a* and the rear case 8*b* joined together, thereby providing a double seal structure including the gasket 112 and the elastic band 117.

Figure 17A:
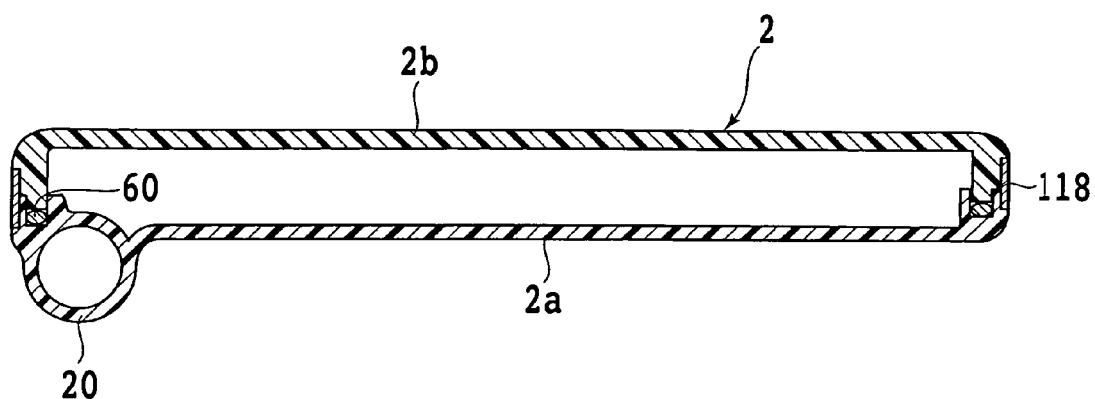
FIG. 17A is a sectional view of a fixed housing (first housing) having a vertically compressed gasket.
Figure 17B:
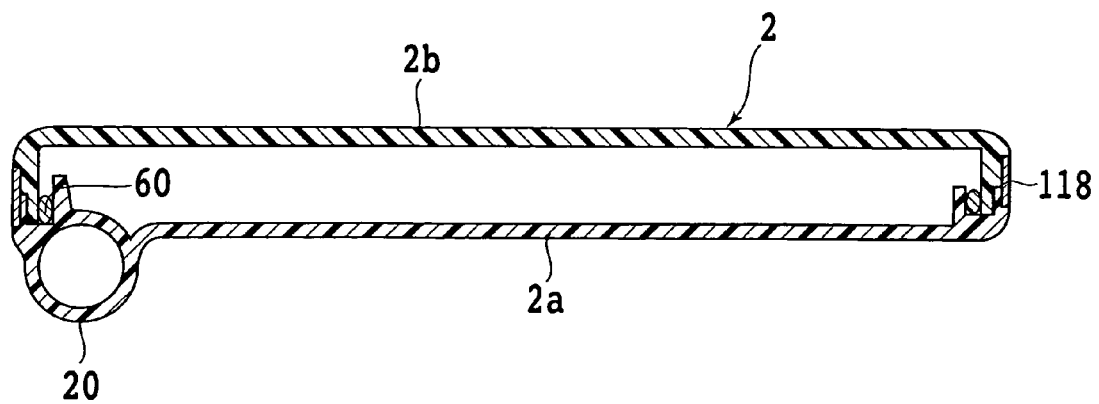
FIG. 17B is a sectional view of a fixed housing having a horizontally compressed gasket.

FIG. 17A is a sectional view of a first housing (fixed housing) 2 composed of a front case 2*a* and a rear case 2*b* joined to the front case 2*a*. The front case 2*a* is formed of Mg alloy, and a double seal structure including a gasket 60 and an elastic band 118 is adopted. In this preferred embodiment, the gasket 60 is retained in a vertically compressed condition. FIG. 17B shows another preferred embodiment wherein the gasket 60 is retained in a horizontally compressed condition. The other structures of this preferred embodiment are similar to those of the preferred embodiment shown in FIG. 17A.

Figure 18A:
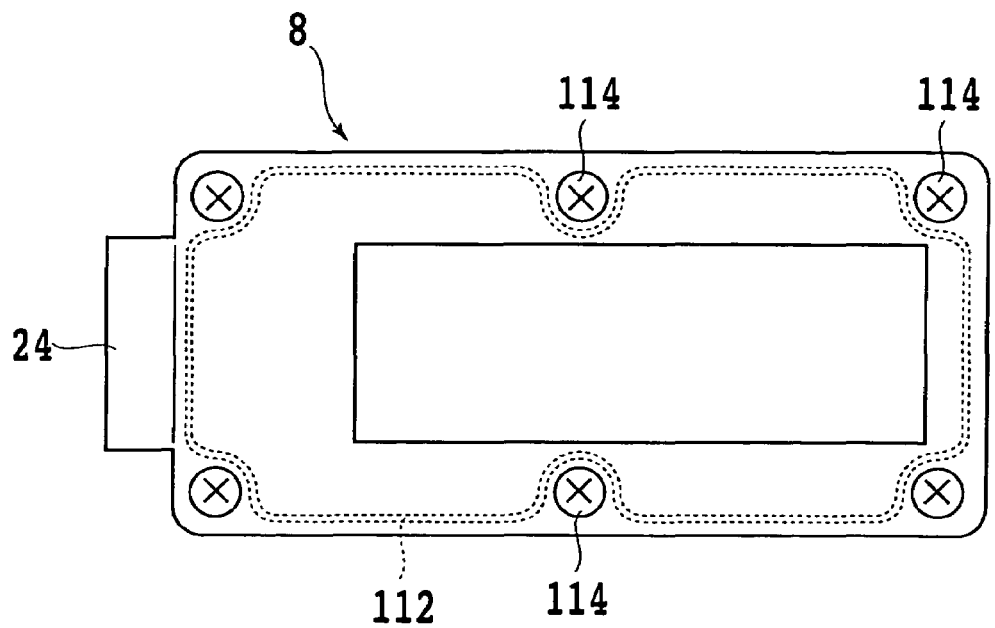
FIG. 18A is a bottom plan view showing the layout of the gasket provided in the movable housing shown in FIG. 16A or 16B.
Figure 18B:
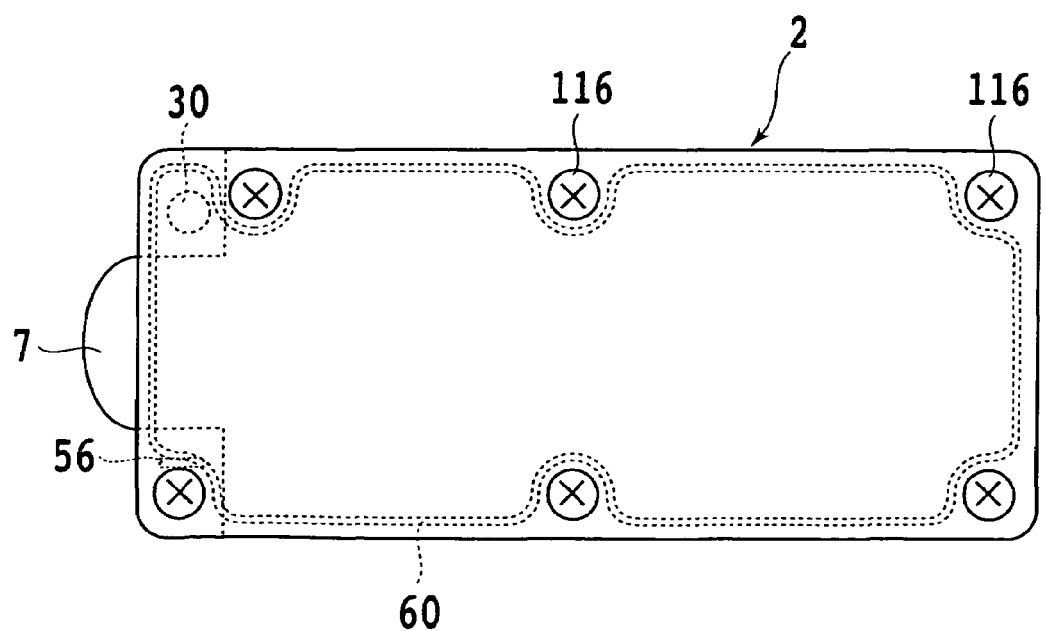
FIG. 18B is a bottom plan view showing the layout of the gasket provided in the fixed housing shown in FIG. 17A or 17B.

FIG. 18A schematically shows the layout of the gasket 112 provided in the second housing 8 shown in FIG. 16A or 16B. To provide a waterproof structure having high reliability, it is preferable that any waterproofed portions be minimized. In the second housing 8 shown in FIG. 18A, a plurality of screws 114 for fixing the front case 8*a* and the rear case 8*b* are arranged outside of the gasket 112. FIG. 18B schematically shows the layout of the gasket 60 provided in the first housing 2 shown in FIG. 17A or 17B. Also in this preferred embodiment, a plurality of screws 116 for fixing the front case 2*a* and the rear case 2*b* are arranged outside of the gasket 60.

Figure 19:
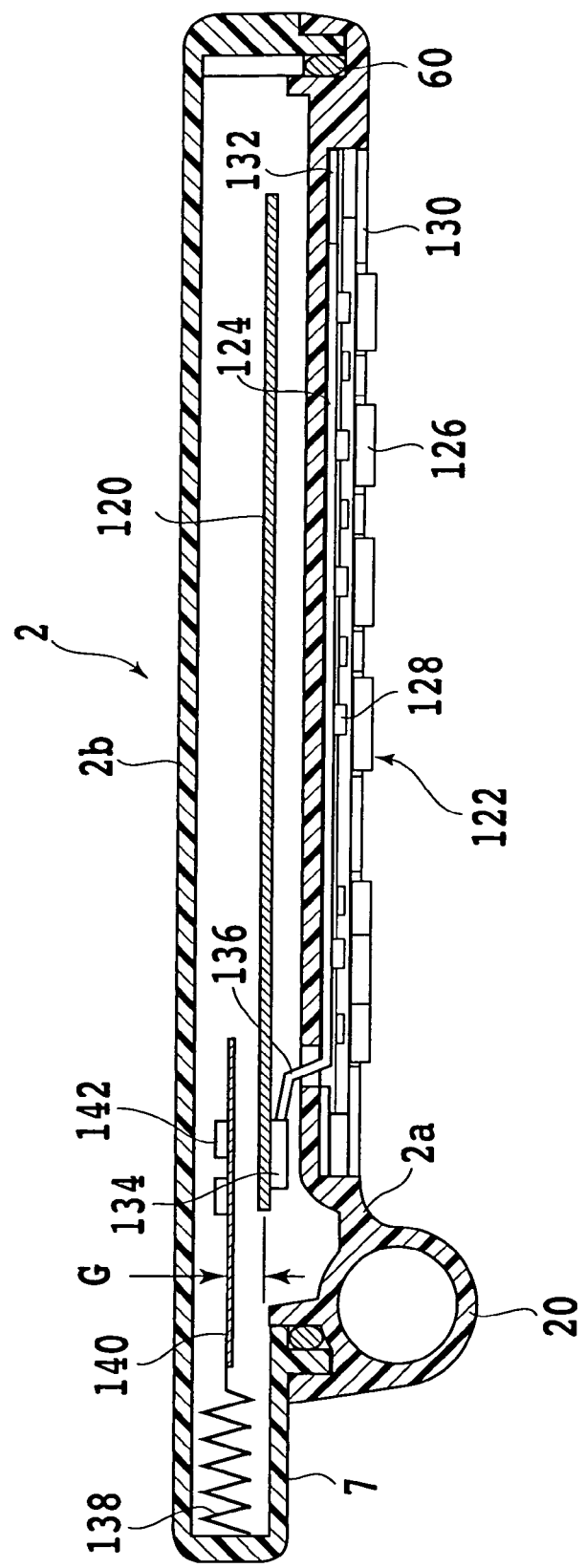
FIG. 19 is a sectional view of a fixed housing having a waterproof structure for an antenna.

FIG. 19 is a sectional view of a first housing (fixed housing) 2 having a waterproof structure for an antenna. In a conventional mobile phone, the antenna has a structure such that a separate component is mounted to a housing. Accordingly, an antenna mounting portion must be subjected to a waterproofing process in the conventional art. In the preferred embodiment shown in FIG. 19, the rear case 2*b* of the first housing 2 is projected to form an antenna accommodating portion 7 for accommodating an antenna 138, so that the entry of water from the antenna mounting portion into the housing 2 can be completely prevented.

To improve the waterproofness of the first housing 2, the front case 2a is formed of metal such as Mg alloy. Accordingly, to satisfy antenna characteristics, the distance G between an antenna printed wiring board 140 on which a matching circuit 142 is mounted and the front case 2a must be set greater than or equal to a given distance, e.g., 3 mm. In FIG. 19, reference numeral 122 denotes a waterproof switch module composed of a switch sheet 124, resin key-tops 126, switch depressing projections 128, and a decorative panel 132. A printed wiring board 120 is accommodated in the first housing 2, and this printed wiring board 120 and the switch sheet 124 are connected with each other through a connector 134 and a flexible printed wiring board 136.

While the present invention is applied to a folding mobile phone in the above description, it should be noted that the applicability of the present invention is not limited to a folding mobile phone, but can be extended to a folding electronic device such as a personal digital assistants (PDA) and a notebook personal computer (notebook PC).

According to the present invention, the gap between the pipe and the first hinge cylinder is tightly sealed by the first gasket, and the gap between the pipe and the second hinge cylinder is tightly sealed by the second gasket. Furthermore, the second end of the first hinge cylinder is tightly closed by the first hinge cap. Thus, the hinge portion of the folding electronic device can be completely waterproofed. Such a waterproof effect at the hinge portion cannot be expected by the structure disclosed in Japanese Patent Laid-open No. 2002-319771 mentioned above.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A folding electronic device comprising:
    a first housing having an integrally formed, first hinge cylinder having a first end and a second end;
    a second housing having an integrally formed, second hinge cylinder having a first end and a second end;
    a pipe inserted in said first end of said first hinge cylinder and said first end of said second hinge cylinder to connect said first housing and said second housing so that said second housing is foldable with respect to said first housing;
    a wiring member inserted through said pipe to connect a first electronic component mounted in said first housing and a second electronic component mounted in said second housing;
    a first gasket provided between said pipe and said first hinge cylinder;
    a second gasket provided between said pipe and said second hinge cylinder;
    a first hinge cap for tightly closing said second end of said first hinge cylinder; and
    a tube having a third gasket at one end and a fourth gasket at the other end, said tube accommodating said wiring member and being inserted through said pipe;
    said third gasket tightly sealing a wiring leading portion of said first housing, said fourth gasket tightly sealing a wiring leading portion of said second housing.

2. The folding electronic device according to claim 1, wherein said wiring member comprises a cable or a flexible printed wiring board.

3. A folding electronic device comprising:
    a first housing having an integrally formed, first hinge cylinder having a first end and a second end;
    a second housing having an integrally formed, second hinge cylinder having a first end and a second end;
    a pipe inserted in said first end of said first hinge cylinder and said first end of said second hinge cylinder to connect said first housing and said second housing so that said second housing is foldable with respect to said first housing;
    a wiring member inserted through said pipe to connect a first electronic component mounted in said first housing and a second electronic component mounted in said second housing;
    a first gasket provided between said pipe and said first hinge cylinder;
    a second gasket provided between said pipe and said second hinge cylinder;
    a first hinge cap for tightly closing said second end of said first hinge cylinder; and
    a first metal pipe inserted in said first end of said first hinge cylinder, said first metal pipe having an inner circumferential surface coming into pressure contact with said first gasket; and
    a second metal pipe inserted in said first end of said second hinge cylinder, said second metal pipe having an inner circumferential surface coming into pressure contact with said second gasket.

4. A folding electronic device comprising:
    a first housing having an integrally formed, first hinge cylinder having a first end and a second end;
    a second housing having an integrally formed, second hinge cylinder having a first end and a second end;
    a pipe inserted in said first end of said first hinge cylinder and said first end of said second hinge cylinder to connect said first housing and said second housing so that said second housing is foldable with respect to said first housing;
    a wiring member inserted through said pipe to connect a first electronic component mounted in said first housing and a second electronic component mounted in said second housing;
    a first gasket provided between said pipe and said first hinge cylinder;
    a second gasket provided between said pipe and said second hinge cylinder;
    a first hinge cap for tightly closing said second end of said first hinge cylinder;
    a third hinge cylinder integrated with said first housing, said third hinge cylinder having a first end and a second end;
    a hinge module having one end inserted in said second end of said second hinge cylinder and another end inserted in said first end of said third hinge cylinder;
    a third gasket provided between said hinge module and said second hinge cylinder; and
    a second hinge cap for tightly closing said second end of said third hinge cylinder.

5. The folding electronic device according to claim 4, further comprising a rib integrated with said first housing for engaging said hinge module to prevent removal of said hinge module from said third hinge cylinder.

6. The folding electronic device according to claim 4, further comprising a hook fixed to said hinge module, said hook being engaged with said second hinge cylinder to prevent removal of said hinge module from said second hinge cylinder.

7. The folding electronic device according to claim 4, wherein said hinge module comprises:

a case inserted and fixed in said third hinge cylinder;
a fixed cam plate accommodated in said case;
a movable cam plate inserted in said second end of said second hinge cylinder so as to be nonrotatable relative to said second hinge cylinder;
a plurality of balls held between said fixed cam plate and said movable cam plate;
a connecting shaft for connecting said case and said movable cam plate; and
a coil spring accommodated in said case for biasing said fixed cam plate toward said movable cam plate.

8. The folding electronic device according to claim 7, wherein said hinge module further comprises an end cap for tightly closing an end portion of said case.

9. The folding electronic device according to claim 7, wherein said hinge module further comprises a waterproof hinge case for tightly closing an end portion of said case.

10. A folding electronic device comprising:
a first housing having an integrally formed, first hinge cylinder having a first end and a second end;
a second housing having an integrally formed, second hinge cylinder having a first end and a second end;
a pipe inserted in said first end of said first hinge cylinder and said first end of said second hinge cylinder to connect said first housing and said second housing so that said second housing is foldable with respect to said first housing;
a wiring member inserted through said pipe to connect a first electronic component mounted in said first housing and a second electronic component mounted in said second housing;
a first gasket provided between said pipe and said first hinge cylinder;
a second gasket provided between said pipe and said second hinge cylinder; and
a first hinge cap for tightly closing said second end of said first hinge cylinder,
wherein said first housing comprises a front case, a rear case joined to said front case, a third gasket interposed between joined surfaces of said front case and said rear case, and a plurality of screws for fixing said front case to said rear case;
said screws being arranged outside of said third gasket.

11. The folding electronic device according to claim 10, wherein said front case is formed of metal.

12. The folding electronic device according to claim 11, wherein said rear case has an antenna accommodating portion;
said folding electronic device further comprising an antenna accommodated in said antenna accommodating portion, and an antenna printed wiring board having a matching circuit connected to said antenna;
said antenna printed wiring board being spaced apart from said metallic front case by a given distance or more.

13. The folding electronic device according to claim 1
A folding electronic device comprising:
a first housing having an integrally formed, first hinge cylinder having a first end and a second end;
a second housing having an integrally formed, second hinge cylinder having a first end and a second end;
a pipe inserted in said first end of said first hinge cylinder and said first end of said second hinge cylinder to connect said first housing and said second housing so that said second housing is foldable with respect to said first housing;
a wiring member inserted through said pipe to connect a first electronic component mounted in said first housing and a second electronic component mounted in said second housing;
a first gasket provided between said pipe and said first hinge cylinder;
a second gasket provided between said pipe and said second hinge cylinder; and
a first hinge cap for tightly closing said second end of said first hinge cylinder,
wherein said second housing comprises a front case, a rear case joined to said front case, a third gasket interposed between joined surfaces of said front case and said rear case, and a plurality of screws for fixing said front case to said rear case;
said screws being arranged outside of said third gasket.

14. The folding electronic device according to claim 13, wherein said front case is formed of metal.

15. A folding electronic device comprising:
a first housing having an integrally formed, first hinge cylinder having a first end and a second end;
a second hinge cylinder having a wiring leading hollow shaft, a first end, and a second end;
a second housing engaged with said wiring leading hollow shaft of said second hinge cylinder so as to be rotatable about said wiring leading hollow shaft;
a pipe inserted in said first end of said first hinge cylinder and said first end of said second hinge cylinder to connect said first housing and said second housing so that said second housing is foldable with respect to said first housing;
a wiring member inserted through said pipe to connect a first electronic component mounted in said first housing and a second electronic component mounted in said second housing;
a first gasket provided between said pipe and said first hinge cylinder;
a second gasket provided between said pipe and said second hinge cylinder;
a first hinge cap for tightly closing said second end of said first hinge cylinder; and
a third gasket provided between said wiring leading hollow shaft of said second hinge cylinder and said second housing.

16. The folding electronic device according to claim 15, wherein said wiring member comprises a cable or a flexible printed wiring board.

17. The folding electronic device according to claim 15, further comprising:
a first metal pipe inserted in said first end of said first hinge cylinder, said first metal pipe having an inner circumferential surface coming into pressure contact with said first gasket; and
a second metal pipe inserted in said first end of said second hinge cylinder, said second metal pipe having an inner circumferential surface coming into pressure contact with said second gasket.

18. The folding electronic device according to claim 15, further comprising:
a third hinge cylinder integrated with said first housing, said third hinge cylinder having a first end and a second end;
a hinge module having one end inserted in said second end of said second hinge cylinder and another end inserted in said first end of said third hinge cylinder;
a fourth gasket provided between said hinge module and said second hinge cylinder; and
a second hinge cap for tightly closing said second end of said third hinge cylinder.

* * * * *